Feb. 22, 1966  D. A. STEINMEYER  3,236,094
CELL FOR TESTING FLUIDS
Original Filed Sept. 12, 1961  2 Sheets-Sheet 1

INVENTOR.
DONALD A. STEINMEYER
BY Francis P. Reilly
— ATTORNEY.

Feb. 22, 1966    D. A. STEINMEYER    3,236,094
CELL FOR TESTING FLUIDS
Original Filed Sept. 12, 1961    2 Sheets-Sheet 2

INVENTOR.
DONALD A. STEINMEYER
BY Francis R. Reilly
ATTORNEY

United States Patent Office 3,236,094
Patented Feb. 22, 1966

3,236,094
CELL FOR TESTING FLUIDS
Donald A. Steinmeyer, Orange, Calif., assignor to Douglas Aircraft Company, Inc., Santa Monica, Calif.
Continuation of application Ser. No. 137,687, Sept. 12, 1961. This application Mar. 5, 1965, Ser. No. 445,817
12 Claims. (Cl. 73—61)

This is a continuation of application Serial No. 137,687 filed September 12, 1961.

This invention pertains to a hydraulic testing device and more particularly to a testing device which utilizes a simplified method for taking samples of fluid from a hydraulic system without contaminating the system.

With the increased use of hydraulic fluids in conjunction with the operation of highly complex machinery and vehicles, such as the ground handling equipment for a missile, it has been found necessary to develop a relatively small, portable, testing device which can be introduced into the lines of the system to take samples or specimens therefrom without introducing contaminants. Heretofore, most testing devices adaptable for use with missile launch support equipment, or the like, has been relatively large and complex. This size and complexity has rendered their use in the field relatively difficult, if not practically impossible. In addition, these devices are not generally contamination free, but introduce into the hydraulic system many undesirable conditions.

In the handling and launching of a missile, reliability of the missile components and systems is important. Therefore, it is extremely important that all reliability impairing factors such as contaminants and impurities be kept from the components and systems.

To obviate the above noted difficulties the present invention is relatively small, simple in operation, and does not introduce into a system contaminants or impurities. To achieve this end, the present invention has been designed to operate through a three-step test procedure; step one, to flush the device with filtered oil from the system; step two, to take a sample of system oil; step three, to filter the oil and wash and dry the device.

Basically, to achieve the above three-step test procedure, the preferred embodiment of the invention comprises a casing including a partially threaded bore extending longitudinally therethrough and a plurality of ports extending laterally from the bore. Inserted into the bore is an internal body. The internal body has a metering chamber extending inward from one face thereof and an indentation in each of its faces. A filter patch assembly is mounted in the indentation in the body adjacent to the mouth of the metering chamber and a test patch assembly is mounted in the indentation in the other face and is connected to the chamber by an outlet passage. Each of the assemblies contains a plurality of filter elements for filtering the fluid introduced into the device.

Other advantages of the invention will hereinafter become more fully apparent from the following description of the annexed drawings which illustrate a preferred embodiment and wherein.

Figure 1:
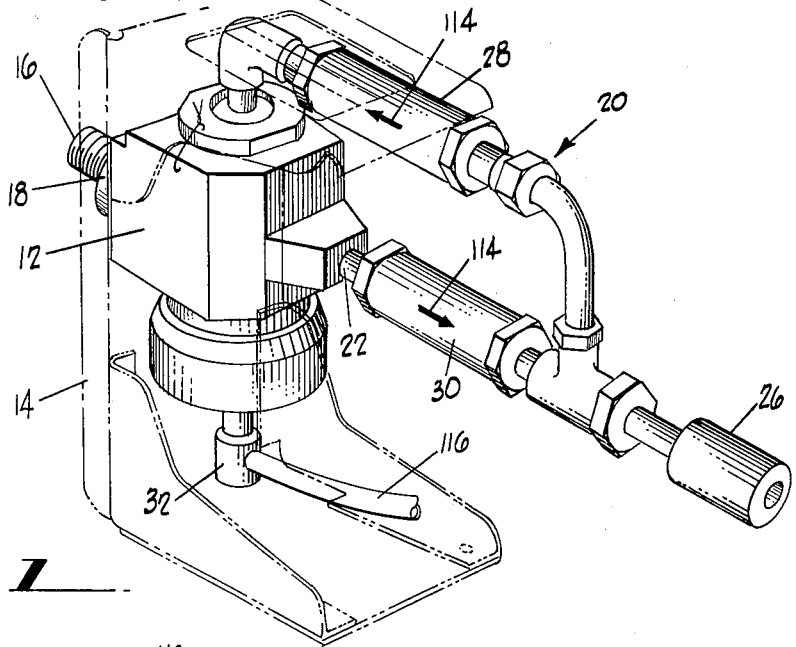
FIGURE 1 is a perspective view of the test device showing its installation on a portable bracket.

Referring now to the drawings wherein like reference characters designate like or corresponding parts throughout the several views, there is shown in FIGURE 1 the test device adapted for insertion into a hydraulic line. In its preferred embodiment, the device comprises a reservoir or container which includes a body or casing 12 which is mounted on a portable mounting bracket or stand 14 and has connected to its various hydraulic fittings. These fittings include a nipple assembly 16 inserted into a pressure port 18 enabling the device to be connected into the pressure side of the hydraulic system, and a socket assembly 20. The socket assembly 20 is connected to the device at the return port 22 and at the inlet port 24. Said assembly 20 also includes a socket 26 for connecting the device into the return line of the system, a pair of check valves 28, 30 for controlling the flow of the fluid and a bleeder valve 32 (to be described later). Thus the device is readily portable and is made operable by merely connecting the nipple assembly 16 and the socket assembly 20 into the pressure and return lines of a hydraulic system.

Figure 2:
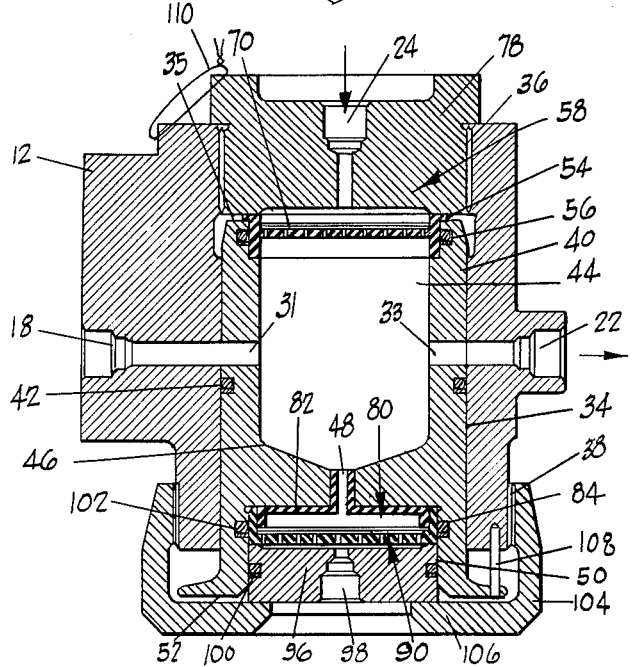
FIGURE 2 is a median vertical sectional view of the test device.

Referring to FIGURE 2, in its preferred embodiment the container comprises a generally rectangular casing or housing 12 through which extends a longitudinal circular bore 34. Said casing has an external threaded portion 38 and lateral pressure and return ports 18, 22 respectively. Said ports 18, 22 entered laterally from said bore 34 coaxial with a common transverse axis and terminate at the exterior surface of said casing. The bore 34 has a threaded portion 36. Inserted into the bore is the internal body 40. In its preferred embodiment the internal body has a generally circular shape and is snugly inserted into the bore. The shape of the body 40 is dictated by the shape of the bore 34 which can be varied within the scope of the herein described invention. Circumferentially surrounding the internal body and mounted in a groove therein for sealing contact with the surface of the bore is a standard O-ring 42.

A metering chamber or cavity 44 extends into the internal body 40 from a first transverse surface or face 35 thereof concentric with the longitudinal axis of the body, and terminates in a slightly inclined or conical portion 46 having an outlet passage 48 therein. Extending laterally from said chamber 44, each coaxial with a common transverse axis are transverse pressure and return passages 31, 33 respectively. Said passages are aligned with said coaxial ports 18, 22 when the body 40 is inserted in the bore 34 in the casing 12. The outlet passage 48 extends into a transverse test patch indentation 50 formed in a second transverse surface or face 52 of the body. A filter patch indentation 54 is formed in the wall of the chamber 44 nearest the first end 35. Inserted into the filter patch indentation and making sealing contact with an O-ring 56 mounted in a groove in the wall thereof is the filter patch assembly 58.

Figure 3:
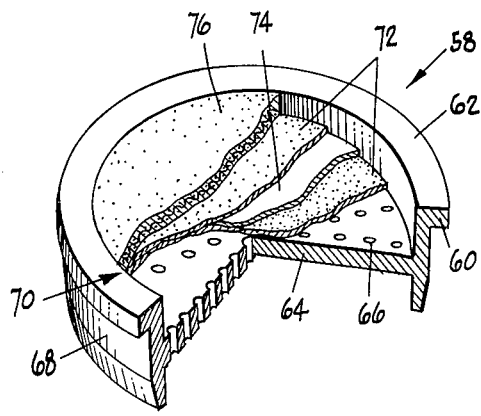
FIGURE 3 is a cutaway perspective view of the filter patch assembly showing the various filter elements.

Referring to FIGURE 3, the filter patch assembly 58 is generally ring-like or cylindrical in shape and has a flanged edge 60. The assembly includes a cartridge 62 which has a transverse section or floor surface 64 through which extends a plurality of apertures or holes 66. The apertures are parallel with the longitudinal axis of said casing 12. The floor 64 is located transversely with respect to the cylindrical portion 68 of the cartridge 62 so that a greater portion thereof lies on one side of the floor than on the other. Supported by said floor on the side thereof adjacent to the greater portion of the cylindrical portion of said cartridge is the filter patch or cleansing filter element 70. The filter element 70 comprises a plurality of relatively stiff support discs 72 typically constructed of a fibrous paper mat with a filter disc 74 maintained between. The filter disc 74 is a submicron membrane filter, such as those made from celluose material.

To maintain the filter element in contact with the floor 64 a bronze wire support 76 rests thereon flush with the surface of the flanged portion 60 of the cartridge 62. Referring to FIGURE 2, to maintain the filter patch assembly 58, in the indentation 54, a plug 78 is threaded into the bore 34 into contact with the flanged portion 60 of said assembly. The plug 78 has the inlet port 24 extending therethrough parallel with the longitudinal axis of the casing 12. This permits fluid to flow into contact with the filter element 70.

Figure 4:
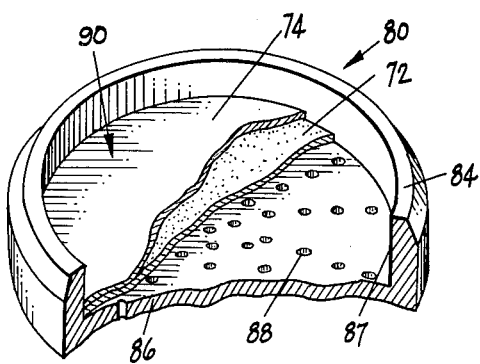
FIGURE 4 is a cutaway perspective view of a portion of the test patch assembly showing the various filter elements.

A test patch assembly 80 is inserted into the test patch indentation 50. This assembly comprises a retainer 82 having a portion thereof inserted into the outlet passage 48 and a test patch cartridge 84. As best seen in FIGURE 4, the test patch cartridge 84 is ring-like or cylindrical in shape having a floor 86 or transverse section containing a plurality of apertures or holes 88 parallel with the longitudinal axis of the casing 12. Supported by the floor 86 on the side thereof adjacent to the cylindrical portion 87 is the test patch or sampling filter element 90. Similar to the cleansing filter element 70, the sampling filter element 90 comprises a support disc 72 in contact with the floor 86 and a filter disc 74 resting on the support disc. The retainer 82 is shaped to fit into the cylindrical cartridge 84 to make contact with a portion of the cylindrical portion 87 and with a portion of the filter disc 74 thus retaining said disc in a fixed position. To retain the test patch assembly 80 in place in indentation 50 a retainer 96 is inserted into said indentation. Said retainer 96 has an outlet port 98 extending therethrough, thus enabling fluid to pass through the test patch assembly 80 and away from the device. Circumferentially surrounding the retainer 96 and mounted in a groove therein for sealing contact with the surface of the indentation 50 is a standard O-ring 100. Also surrounding the test patch cartridge 84 and mounted in a groove in indentation 50 for sealing contact with the surface of the cartridge is a standard O-ring 102. To maintain the test patch assembly and retainer 96 in position in the indentation 50 a threaded cap 104 is mated with the external threads 38 on the casing 12. The cap has a lip portion 106 which extends into contact with a portion of the retainer 96, thus holding it and the assembly in position.

To restrain the internal body 40 from rotation after it has been inserted into the bore 34, a pin 108 is inserted through a portion of the body into an aperture in the casing 12. A lock wire 110 is provided to prevent separation of the plug 78 from the casing 12 when the plug is removed from the bore 34. Said wire 110 extends through adjacent apertures in the plug and casing thereby joining the two.

Figure 5:
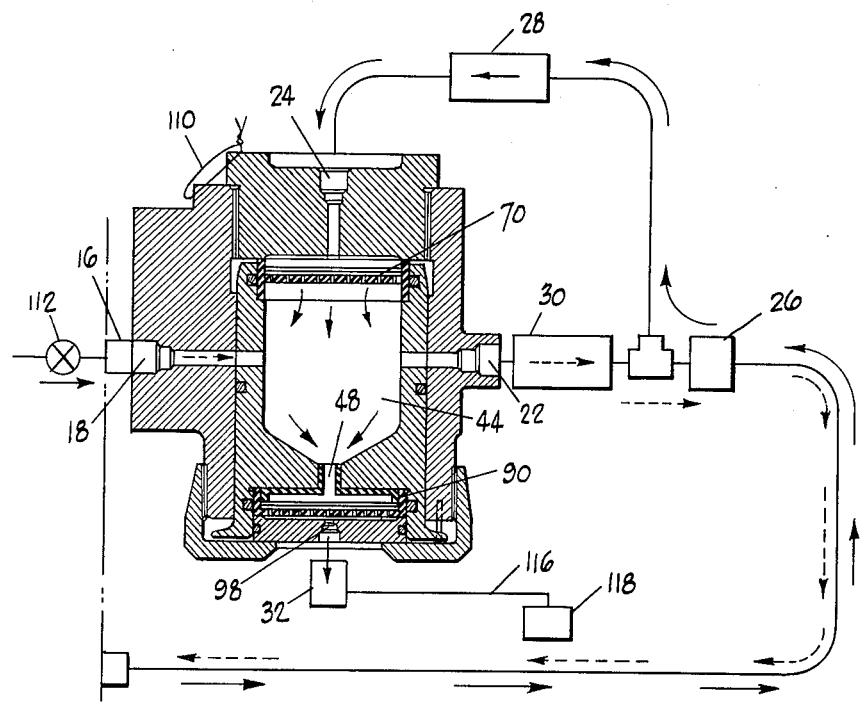
FIGURE 5 is a block diagram of the device showing the sequence of operation as a sample of fluid is taken from a hydraulic line.

Referring to FIGURES 1 and 5, the preferred embodiment of the present invention operates in the following manner. To take a test sample from a hydraulic line, the nipple assembly 16 is connected into the high pressure side of the line and the socket 26 is connected into the low pressure or return side of the line. Prior to the connecting of the device into the system, shutoff valve 112 is closed to prevent high pressure fluid from flowing into the device after it is connected. Therefore, after the device has been connected, fluid will flow into the device through the return line only as indicated by the solid arrows in FIGURE 5. Through the location of the check valves 28 and 30, fluid flows only in the direction of the arrows 114 shown on the valves. This results in the fluid from the return line entering the inlet port 24, whereafter it is filtered of existing contaminants by the filter patch element 70. The filtered fluid then passes into the metering chamber 44. As the fluid flows into the chamber 44 the bleeder valve 32 at outlet port 98 is opened, enabling the fluid to flow through the test patch element 90 and out through the outlet port 98, bleeder valve 32 and through a dump line 116 to a waste container 118. Thus, the first step of the test procedure has been completed; that is, the device has been cleaned with fluid entering from the return line and filtered by the filter patch element.

The second step is commenced by closing the bleeder valve 32 and opening the shutoff valve 112. This introduces high pressure system oil into the metering chamber 44. The system oil is prevented from flowing up through the filter patch element 70 or down through the test patch element 90 by back pressure existing in the system. After a sufficient amount of fluid has passed through the device, as indicated by the broken arrows, the shutoff valve 112 is closed. Thereafter, the device is disconnected from the return line and the pressure line. The nipple assembly 16 and socket 26 are both stopped or closed at the same time by suitable means to prevent leakage therefrom. This concludes the second step. The third step is commenced by connecting socket 26 to a solvent and nitrogen system. The solvent is of a commercial nature and depends upon the nature of the hydraulic fluid that has been taken from the system. After the connection to the solvent system, the solvent passes through the test device in the same fashion as the fluid of step one. As the solvent is flowing through the chamber 44 the bleeder valve 32 is opened. The opening of the valve causes the solvent to force the oil through the test patch element 90 and out the dump line 116 and at the same time leaches the oil out of the filter disc 74. When the solvent flows from the dump line 116 with no indication of oil in it, the solvent is disconnected and a dry air or nitrogen source is connected to the socket 26. The air or nitrogen then passes through the device drying the internal parts of the device. Thereafter, to examine the filter disc 74 of test patch element 90 and compare the resultant deposit of contaminants thereon with known samples of contaminants, cap 104 is detached from the casing 12 and retainer 96, permitting cartridge 84 to be removed from indentation 50.

Thus, through the operation of the device as above described, a sample of fluid can be taken from a highly pressurized system without introducing contamination into the system. After the sample has been taken, it can be filtered through a relatively clean test device, and the resultant deposit of contaminants is readily accessible for comparison with standard values. In this fashion, the above described device provides a test procedure readily adapted to field and laboratory uses.

I claim:

1. A cell for testing liquids comprising: a casing including a partially threaded bore extending longitudinally therethrough, a plurality of pressure and return ports extending laterally from said bore coaxial with a common transverse axis; an internal body including first and second transverse surfaces, coaxial transverse pressure and return passages, a longitudinal outlet passage, a central longitudinal metering chamber extending from said first transverse surface to one extremity of said outlet passage, a test patch indentation in said second transverse surface and a filter patch indentation in the wall of said chamber immediately adjacent to said first transverse surface, said body being adapted to be inserted into the bore of said casing whereby said pressure and return ports and passages are aligned; a filter patch assembly adapted to be inserted into said filter patch indentation to close said chamber, said assembly including a supporting member having a transverse section containing a plurality of holes parallel with the longitudinal axis of said body, and a filter element in contact with said thin transverse section on the side thereof opposite to said chamber; a plug member having a portion thereof insertable into the bore in said casing and engageable with said threaded portion therein and an inlet port extending through said plug parallel with the longitudinal axis of said casing; a test patch assembly insertable into said test patch indentation, said assembly including a supporting member engageable with the walls of said indentation including a transverse section containing a plurality of holes parallel with the longitudinal axis of said body and a cylindrical flanged portion, a test filter element in contact with said transverse section on the side thereof adjacent to said flange portion and a first retainer adapted to hold said element in contact with said transverse section, said first retainer having a portion thereof in contact with said outlet passage and said flanged portion; a second retainer engageable with a portion of said test patch indentation to retain said test filter assembly in a fixed position, said second retainer containing a central longitudinal outlet port adapted to flow fluid out of said chamber; and a cap engageable with the external thread on said casing to secure said second retainer in position and permit disassembly of said cell for examination of said test filter element.

2. A cell for testing liquids comprising: a casing including a partially threaded bore extending longitudinally therethrough, a plurality of pressure and return ports extending laterally from said bore coaxial with a common transverse axis; an internal body including a first and second transverse surface, transverse pressure and return passages, a longitudinal outlet passage and a central longitudinal metering chamber extending from said first transverse surface to one extremity of said outlet passage, a test patch indentation in said second transverse surface and a filter patch indentation in the wall of said chamber immediately adjacent to said first transverse surface, said body being adapted to be inserted into the bore of said casing to align respectively the pressure and return passages with the pressure and return ports of said casing; connecting means inserted into said pressure and return ports adapted to connect said cell into a hydraulic system; a filter patch assembly insertable into said filter patch indentation to close said chamber, said assembly including a supporting member having a transverse section containing a plurality of holes parallel with the longitudinal axis of said body, and a filter element in contact with said transverse section on the side thereof opposite to said chamber; a plug member having a portion thereof insertable into the chamber in said casing and engageable with said thread portion therein and an inlet port extending therethrough parallel with the longitudinal axis of said casing; a test patch assembly insertable into said test patch indentation, said assembly including a supporting member engageable with the walls of said indentation including a transverse section containing a plurality of holes parallel with the longitudinal axis of said body and a cylindrical flanged portion, a test filter element in contact with said transverse section on the side thereof adjacent to said flanged portion and a first retainer adapted to hold said element in contact with said transverse section, said first retainer having a portion in contact with said outlet passage and said flanged portion; a second retainer engageable with a portion of said test patch indentation to retain said test filter assembly in a fixed position, said second retainer including a central longitudinal outlet port adapted to flow fluid out of said chamber; and a cap engageable with the external thread on said casing to secure said second retainer in position and permit disassembly of said cell for examination of said test filter element whereby the contaminants and impurities in a hydraulic system can be readily determined.

3. Means for testing liquids comprising: a container having a liquid receiving chamber therein, a pressure port, a return port, an inlet port and an outlet port; a cleansing filter mounted in said chamber across the inlet port to cleanse liquid introduced into said chamber by said inlet port; a testing filler mounted in said chamber across the outlet port to test-filter liquid introduced into said chamber by said pressure port; means for selectively connecting a high pressure side of a hydraulic system to said pressure port; means for selectively connecting a low pressure side of the system to said return port and including a check valve for preventing liquid flow towards said return port; means for selectively connecting the low pressure side of the system to said inlet port and including a check valve for preventing liquid flow away from said inlet port; and means for selectively connecting a dump line to said outlet port whereby a sample of liquid can be taken from the hydraulic system and tested for impurities without introducing contaminants into said system by selectively operating all of said connecting means in a predetermined sequence of flushing said chamber with cleansed liquid from the system, taking a sample of system liquid, and test filtering the sample for obtaining a collection of impurities on said testing filter.

4. A cell for testing liquids comprising: a casing; a liquid containing means adapted to be inserted in said casing for containing a sample of liquids; flow means in said casing and said containing means adapted to allow liquid to flow into and out of said containing means; connecting means attached to said flow means for selectively connecting said cell into a hydraulic system; cleansing filter means mounted to said containing means in contact with one end thereof to cleanse liquid as it flows through said cleansing filter means into said containing means; test filter means mounted to said containing means in contact with the other end thereof to test-filter liquid as it flows through said test filter means out of said containing means; inlet means for selectively connecting said cleansing filter means to said hydraulic system; and outlet means for selectively connecting said test filter means to a dump line, whereby a sample of liquid can be taken from the hydraulic system and tested for impurities without introducing contaminants into said system by selectively operating said connecting means, said inlet means and said outlet means in a predetermined sequence of flushing said cell with cleansed liquid from the system, taking a sample of system liquid, and test filtering the sample for obtaining a collection of impurities on said test filter means.

5. Apparatus as defined in claim 4 wherein said cleansing and test filter means each includes an assembly comprising at least one relatively stiff, liquid permeable support sheet member and one submicron membrane filter sheet member in contiguous contact with said support sheet member.

6. A cell for testing liquid comprising: a casing having a longitudinal bore, means defining a first pressure port and means defining a first return port in said casing communicating with said longitudinal bore; an internal body having a central longitudinal chamber open at one end thereof and a passage and indentation communicating with the chamber at the other end, means defining a second pressure port and means defining a second return port, said second pressure and return ports connecting with said chamber and said body being adapted to be inserted into said longitudinal bore to align said first pressure and return ports in said casing respectively with said second pressure and return ports in said body; cleansing filter means in contact with a portion of said internal body and adapted to close the one end of said chamber; test filter means adapted to be inserted into said indentation for closing the passage communicating with said chamber; and means for connecting said cell into a hydraulic system, including means for selectively connecting said first pressure port to a high pressure line of the system, means for selectively connecting said first return port and said cleansing filter means to a low pressure line of the system, and means for selectively connecting said test filter means to a dump line whereby a sample of liquid can be taken from the hydraulic system and tested for impurities without introducing contaminants into said system by selectively operating said connecting means in a predetermined sequence of flushing said cell with cleansed liquid from the system, taking a sample of system liquid, and test filtering the sample for obtaining a collection of impurities on said test filter means.

7. Apparatus as defined in claim 6 wherein said cleansing and test filter means each includes an assembly comprising a cartridge having a perforated floor and at least one relatively stiff fibrous support disc and one submicron membrane filter disc which is supported by said floor.

8. Means for testing liquids comprising: a container including a liquid receiving chamber therein, a pressure port, a return port, an inlet port and an outlet port; a cleansing filter mounted in said container across a liquid flow path from said inlet port to said chamber, for cleansing liquid being introduced into said chamber by said inlet port; a testing filter mounted in said container across a liquid flow path from said chamber to said outlet port, to test-filter liquid introduced into said chamber by said pressure port; means for selectively connecting a high pressure side of a hydraulic system to said pressure port; means for selectively connecting a low pressure side of the system to said return port and including check valve means for preventing liquid flow towards said return port into said chamber; means for selectively connecting a source of solvent to said inlet port and including check valve means for preventing liquid flow out of said chamber and away from said inlet port; and means for selectively connecting a dump line to said outlet port, whereby a sample of liquid can be taken from the hydraulic system and tested for impurities without introducing contaminants into said system by selectively operating all of said connecting means in a predetermined sequence of taking a sample of system liquid into said chamber, test filtering the sample through said testing filter, and passing solvent through said cleansing filter, chamber and testing filter to obtain a readily visible collection of impurities on said testing filter.

9. A cell for testing liquids comprising: a casing including a liquid containing chamber therein for containing a sample of liquid; flow means in said casing adapted to allow liquid to flow into and out of said chamber; connecting means attached to said flow means for selectively connecting said cell into a hydraulic system; cleansing filter means mounted to said casing in communication with one end of said chamber to cleanse liquid as it flows through said cleansing filter means into said chamber; test filter means mounted to said casing in communication with another end of said chamber to test-filter liquid as it flows out of said chamber through said test filter means; inlet means for selectively connecting said cleansing filter means to a source of solvent; and outlet means for selectively connecting said test filter means to a dump line, whereby a sample of liquid can be taken from the hydraulic system and tested for impurities without introducing contaminants into said system by selectively operating said connecting means, said inlet means and said outlet means in a predetermined sequence of taking a sample of system liquid into said chamber, test filtering the sample through said test filter means, and passing solvent through said cleansing filter means, chamber and test filter means to obtain a readily visible collection of impurities on said test filter means.

10. Apparatus as defined in claim 9 wherein said cleansing and test filter means each includes an assembly comprising at least one relatively stiff, liquid permeable support sheet member and one submicron membrane filter sheet member in contiguous contact with said support sheet member.

11. A cell for testing liquids comprising: a casing including a longitudinal chamber therein, means defining a pressure port, means defining a return port, means defining an inlet port and means defining an outlet port, said pressure and return ports in said casing communicating laterally with said chamber and said inlet and outlet ports in said casing communicating longitudinally with respective ends of said chamber; cleansing filter means mounted in said casing and disposed across a liquid flow path from said inlet port to its associated end of said chamber, for cleansing liquid being introduced into said chamber by said inlet port; test filter means mounted in said casing and disposed across a liquid flow path from the other end of said chamber to said outlet port; and means for connecting said cell into a hydraulic system, including means for selectively connecting said pressure port to a high pressure line of the system, means for selectively connecting said return port means to a low pressure line of the system, means for selectively connecting a source of solvent to said inlet port, and means for selectively connecting said test filter means to a dump line whereby a sample of liquid can be taken from the hydraulic system and tested for impurities without introducing contaminants into said system by selectively operating said connecting means in a predetermined sequence of taking a sample of system liquid into said chamber, test-filtering the sample through said test filter means, and passing solvent through said cleansing filter means, chamber and test filter means to obtain a readily visible collection of impurities on said test filter means.

12. Apparatus as defined in claim 11 wherein said cleansing and test filter means each includes an assembly comprising a cartridge having a perforated floor and at least one relatively stiff fibrous support disc and one submicron membrane filter disc which are supported by said floor.

No references cited.

LOUIS R. PRINCE, *Primary Examiner.*